US011529837B2

(12) United States Patent
Hoult

(10) Patent No.: US 11,529,837 B2
(45) Date of Patent: Dec. 20, 2022

(54) DAMPER CONTROL

(71) Applicant: McLaren Automotive Limited, Woking (GB)

(72) Inventor: Will Hoult, London (GB)

(73) Assignee: McLaren Automotive Limited, Woking (GB)

( * ) Notice: Subject to any disclaimer, the term of this patent is extended or adjusted under 35 U.S.C. 154(b) by 752 days.

(21) Appl. No.: 16/476,014

(22) PCT Filed: Jan. 5, 2018

(86) PCT No.: PCT/GB2018/050020
§ 371 (c)(1),
(2) Date: Jul. 3, 2019

(87) PCT Pub. No.: WO2018/127701
PCT Pub. Date: Jul. 12, 2018

(65) Prior Publication Data
US 2019/0381850 A1 Dec. 19, 2019

(30) Foreign Application Priority Data
Jan. 5, 2017 (GB) .................................... 1700149

(51) Int. Cl.
*B60G 17/08* (2006.01)
*B60G 17/018* (2006.01)
(Continued)

(52) U.S. Cl.
CPC ......... *B60G 17/018* (2013.01); *B60G 17/019* (2013.01); *B60G 17/08* (2013.01);
(Continued)

(58) Field of Classification Search
CPC .... B60G 17/018; B60G 17/019; B60G 17/08; B60G 21/06; B60G 2400/204; B60G 2400/252; B60G 2400/5182
See application file for complete search history.

(56) References Cited

U.S. PATENT DOCUMENTS 5,400,880 A 3/1995 Ryan
5,444,621 A * 8/1995 Matsunaga ........ B60G 17/0165
280/5.518

(Continued)

FOREIGN PATENT DOCUMENTS

EP 0779168 A2 6/1997
EP 2098390 A1 9/2009
(Continued)

OTHER PUBLICATIONS

International Search Report and the Written Opinion for Appln. No PCT/GB2018/050020 dated Mar. 27, 2018, 14 pages.
(Continued)

*Primary Examiner* — Toan C To
(74) *Attorney, Agent, or Firm* — Dergosits & Noah LLP

(57) ABSTRACT

A vehicle comprising: a vehicle body; a plurality of wheel assemblies each having a rotation axis; at least one suspension linkage, each suspension linkage coupling a respective wheel assembly to the vehicle body to permit motion of the rotation axis of each respective wheel assembly relative to the vehicle body; a damper coupled to a respective suspension linkage to constrain the motion of the associated wheel assembly by applying a damper reaction force to the suspension linkage, the damper being configured to be responsive to a damper force control output to vary the damper reaction force being applied to the suspension linkage; at least one vehicle sensor configured to provide vehicle condition data; and a damper control unit configured to generate the damper force control output that causes the damper to
(Continued)

generate respective damper reaction forces to act against the suspension linkage to control the motion of the wheel assembly towards a set position for the wheel assembly relative to the vehicle body, adjust the set position based on a change in the vehicle condition data, and calculate the set position based on variations in the vehicle condition data over time.

21 Claims, 1 Drawing Sheet

(51) Int. Cl.
  *B60G 17/019* (2006.01)
  *B60G 21/06* (2006.01)
(52) U.S. Cl.
  CPC ........ *B60G 21/06* (2013.01); *B60G 2400/204* (2013.01); *B60G 2400/252* (2013.01); *B60G 2400/5182* (2013.01)

(56) References Cited

U.S. PATENT DOCUMENTS

| | | | |
|---|---|---|---|
| 5,446,662 A | 8/1995 | Kojima et al. | |
| 5,944,763 A | 8/1999 | Iwasaki | |
| 6,223,108 B1* | 4/2001 | Izawa | B60G 17/0195 280/5.513 |
| 6,285,935 B1 | 9/2001 | Murata | |
| 6,295,493 B1* | 9/2001 | Kawazoe | B60G 17/0152 280/5.506 |
| 10,239,519 B2* | 3/2019 | Koumura | B60W 30/02 |
| 10,538,136 B2* | 1/2020 | Saito | B60G 17/08 |
| 2006/0118370 A1* | 6/2006 | Izawa | F16F 9/535 188/267.2 |
| 2006/0224285 A1* | 10/2006 | Izawa | B60G 11/14 701/37 |
| 2007/0029711 A1* | 2/2007 | Ehara | B60G 17/08 267/64.28 |
| 2008/0140285 A1* | 6/2008 | Sekiya | B60G 17/018 701/38 |
| 2010/0204885 A1* | 8/2010 | Kajino | B60G 21/0555 701/37 |
| 2010/0211261 A1* | 8/2010 | Sasaki | B60G 17/016 701/37 |
| 2011/0022265 A1* | 1/2011 | Sekiya | F16F 9/535 701/37 |
| 2011/0025000 A1* | 2/2011 | Inoue | B60G 17/06 280/5.507 |
| 2015/0088379 A1* | 3/2015 | Hirao | B60G 17/08 701/37 |
| 2015/0375592 A1 | 12/2015 | Lannen et al. | |
| 2016/0272198 A1 | 9/2016 | Matoy et al. | |
| 2017/0274724 A1* | 9/2017 | Liu | B60G 17/01933 |
| 2017/0326936 A1* | 11/2017 | Saito | B60G 17/018 |

FOREIGN PATENT DOCUMENTS

| | | |
|---|---|---|
| EP | 2769860 A1 | 8/2014 |
| GB | 2261048 A | 5/1993 |
| GB | 2474030 A | 4/2011 |
| JP | 63199112 A | 8/1988 |
| JP | 2005238992 A | 9/2005 |

OTHER PUBLICATIONS

Patents Act 1977: Search Report under Section 17(5) for Application No. GB1700149.6 dated Jun. 9, 2017, 4 pages.

* cited by examiner

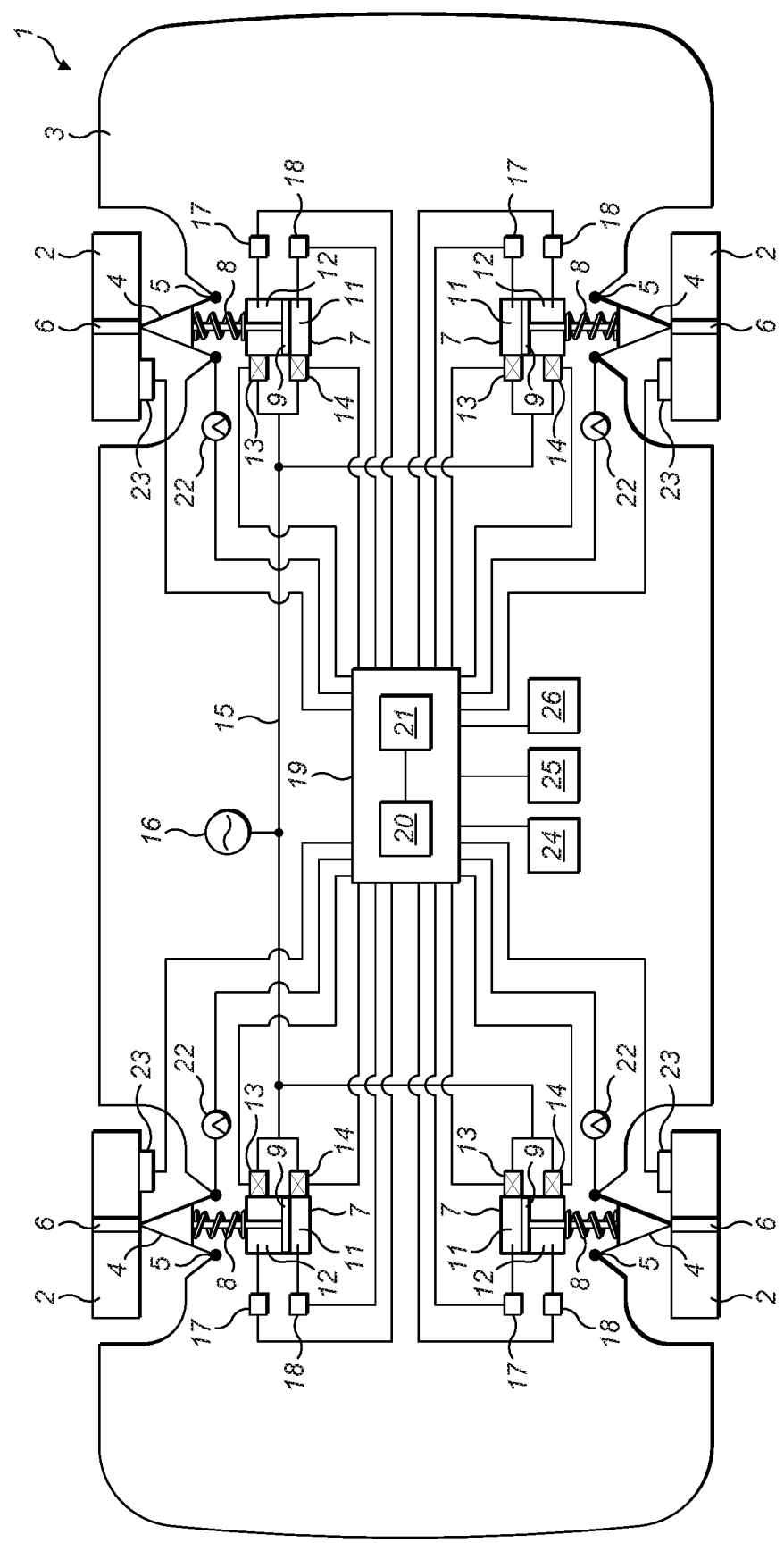

DAMPER CONTROL

CROSS-REFERENCE TO RELATED APPLICATIONS

The present Application claims the benefit of International Application No. PCT/GB2018/050020, entitled "DAMPER CONTROL," filed Jan. 5, 2018, which claims the benefit of Great Britain Patent Application No. 1700149.6, entitled "DAMPER CONTROL" field on Jan. 5, 2017. The contents of International Application No. PCT/GB2018/050020 and Great Britain Patent Application No. 1700149.6 are hereby incorporated by reference.

FIELD OF DISCLOSURE

This invention relates to a vehicle comprising a damper control unit.

BACKGROUND OF THE INVENTION

A typical road vehicle comprises a suspension system between each wheel of the vehicle and a vehicle body. The suspension system may comprise a suspension linkage for each wheel of the vehicle which supports the body of the vehicle by connecting between the respective wheel and the body of the vehicle. Each wheel is typically mounted on bearings and the bearings are attached to the body of the vehicle via the suspension linkages. The suspension linkages support the body against those bearings and thus against the wheels.

Each suspension linkage is designed to permit the wheels of the vehicle to move relative to the body of the vehicle. This movement of the wheels enables the vehicle body to be at least partially isolated from displacements of the wheels relative to the vehicle body. The displacement range provided by the suspension linkages of each wheel, relative to the vehicle body, is generally limited. This limitation normally stems from the packaging of the suspension systems in the vehicle. For example, the wheels are normally located in wheel arches of the vehicle body and thus the wheels can only move upwards a certain distance before coming in to contact with the interior of the wheel arches. Therefore, the motions of the wheels are generally constrained to avoid this happening.

If a suspension linkage is allowed to reach the end of its travel then this can result in a hard stop in the motion range of the linkage and thus the wheel attached to it. Such a hard stop may provide a large force on the suspension linkage, wheel and/or vehicle body. This, at a minimum, can lead to discomfort for the occupants of the vehicle or worse lead to damage to the vehicle. Therefore, vehicles typically comprise at least one damper which is used to control the motion of the suspension linkages. The dampers control the motion of the suspension linkages by generating a force on the respective suspension linkage. This force generally acts against the motion direction of the suspension linkage to thus restrict the motion of the suspension linkage as it reaches its end points.

The suspension linkage may also include components such as springs to also control the motion of the vehicle's body relative to the wheels and assist in supporting the vehicle body. For example, the vehicle may have four wheels and be provided with a double wishbone suspension at each of the four wheels. The double wishbone suspension will be coupled between the bearing of the wheel and the body of the vehicle to allow the wheel to move relative to the body of the vehicle. A damper may be connected between one of the wishbones of the suspension and the body of the vehicle to control the movement of the wheel relative to the body of the vehicle.

It is common for at least one damper to be provided per suspension linkage so that the motion of that suspension linkage can be controlled independently of the other suspension linkages. By controlling the motion of the suspension linkage, the at least one damper in effect controls the motion of the associated wheel. The dampers, by controlling the motion of suspension linkages and thus the wheels, therefore can influence the ride quality of the vehicle, the grip of the tyres because the tyre contact with the ground is influenced by the damper, and/or the handling of the vehicle because the motion of the body of the vehicle is influenced by the damper. Therefore, the way in which the dampers operate to control the motion of their associated suspension linkages, and thus the suspension system, influences the balance between ride quality, tyre grip and handling of the vehicle.

The dampers that control the motion of the suspension linkages may be configured so that the force that the at least one damper generates on its respective suspension linkage can be varied according to the mode and size of motion that the wheels are currently undergoing. The modes of motion may be heave, pitch, roll and warp and the one or more dampers in the suspension linkages may be capable of being controlled to provide independent stiffness and damping for each of those modes of motion. Examples of such systems are described in WO2011/039498 and EP2769860, the technical descriptions of which are incorporated by reference where permitted by law although the present application should be interpreted without reference to these documents. In these systems the chambers on either side of a damper piston comprised in a damper unit are connected to chambers of other damper units to permit fluid flow there between. These connections may also comprise restrictions and accumulators. The damper piston can move within the damper unit to vary the volume of the chambers and thus cause fluid to be drawn in or forced out of respective chambers. The damper units may have more than one damper piston and separate chambers associated with each damper piston. The interconnection of the damper chambers permits the damping forces associated with each damper to be controlled. The damper unit that has more than one damper piston, together with the fluid interconnections, enables damping of roll motion of the vehicle to be decoupled from the damping of heave.

The dampers may comprise variable restrictions to the fluid connections between the damper chambers and the exterior of the damper which enable the damper forces, for a given position and motion of the suspension linkage, generated by the damper to be altered. Such adjustments are generally known as semi-active damping because the dampers can be controlled to alter the restraint of the motion of the suspension linkages without actively urging the suspension linkage to move in a particular direction. The dampers may also be capable of actively urging the suspension linkage to move in a particular direction. In this case, the adjustments are generally known as active damping because the dampers are active dampers and can operate as actuators to both actively urge the suspension linkage and resist the suspension linkage's motion.

The motion of the vehicle body, the wheels and suspension linkages together with the damper forces can be modelled to attempt to calculate the optimal force that a damper should generate at a given moment. Examples of such modelling are described in:

Brezas, P. and Smith, M. C. (2012) *LQ optimal and risk-sensitive control for vehicle suspensions.* Proc. IEEE 51st Annu. Conf. Decision Control, pp. 2465-2470;

Brezas, P (2013) *Time-domain optimal control for vehicle suspensions.* PhD Thesis, University of Cambridge. EThOS ID: uk.bl.ethos.607986;

Brezas, P and Smith, M C (2014) *Linear Quadratic Optimal and Risk-Sensitive Control for Vehicle Active Suspensions.* IEEE TRANSACTIONS ON CONTROL SYSTEMS TECHNOLOGY, VOL. 22, NO. 2, pp 543-556; and Brezas, P and Smith, M C and Hoult, W (2015) *A clipped-optimal control algorithm for semi-active vehicle suspensions: Theory and experimental evaluation.* Automatica, 53. pp. 188-194. ISSN 0005-1098;

the technical descriptions of which are incorporated herein by reference where permitted by law although the present application should be interpreted without reference to these documents. However, such modelling is complex and there are therefore significant challenges in applying such modelling to a real-time damping control system. For example, if the control of the damper forces and/or the inputs into the model are incorrect then instability in the vehicle suspension system can result.

It would therefore be desirable for there to be improved methods of control of the forces generated by dampers in suspension systems.

SUMMARY OF THE INVENTION

According to a first aspect of the present invention there is provided a vehicle comprising: a vehicle body; a plurality of wheel assemblies each having a rotation axis; at least one suspension linkage, each suspension linkage coupling a respective wheel assembly to the vehicle body to permit motion of the rotation axis of each respective wheel assembly relative to the vehicle body; a damper coupled to a respective suspension linkage to constrain the motion of the associated wheel assembly by applying a damper reaction force to the suspension linkage, the damper being configured to be responsive to a damper force control output to vary the damper reaction force being applied to the suspension linkage; at least one vehicle sensor configured to provide vehicle condition data; and a damper control unit configured to generate the damper force control output that causes the damper to generate respective damper reaction forces to act against the suspension linkage to control the motion of the wheel assembly towards a set position for the wheel assembly relative to the vehicle body, adjust the set position based on a change in the vehicle condition data, and calculate the set position based on variations in the vehicle condition data over time.

The change in vehicle condition data may indicate that the mass of the vehicle has changed. The change in vehicle condition data may indicate a change in the aero-loading on the vehicle. The change in vehicle condition data may indicate a change in vehicle speed. The damper control unit may be configured to calculate an adjustment to a normal position of the at least one suspension elements based on the change in vehicle condition data and adjust the set position based on that calculated adjustment.

The damper control unit may be configured to calculate the set position based on variations in the vehicle condition data over time by detecting a steady-state motion condition for the vehicle based on the vehicle condition data; and obtaining an average of the position of the wheel assembly relative to the vehicle body from the vehicle condition data over a period of steady-state motion of the vehicle. The damper control unit may be configured to calculate the damper force control output based on the vehicle condition data. The damper control unit may be configured to calculate the damper force control output based on an average of at least one sensed vehicle parameter comprised in the vehicle condition data over time and calculate the set positions of the suspension linkages based on that average. The damper coupled to a respective suspension linkage may constrain the motion of the associated wheel assembly by applying a damper reaction force in a direction opposite to the motion of the associated wheel assembly.

The dampers may be fluid dampers and the dampers may be configured to produce the damper reaction force by controlling fluid flow between at least one damper chamber and the exterior of the damper. The at least one vehicle sensor may comprise pressure sensors for each damper configured to sense the pressure of fluid within the at least one chamber of the dampers; the damper control unit may be configured to generate the damper force control output based on the current damper reaction force of the dampers, and may be configured to calculate the current damper reaction forces based on the pressure of fluid within the at least one chamber of the dampers. The dampers may be connected together by a fluid interconnection system; the damper control unit may be configured to calculate the current damper reaction forces based on the pressure of fluid within the at least one chamber of the dampers by removing the fluid pressure due to the fluid interconnection system.

According to a second aspect of the present invention there is provided a vehicle comprising: a vehicle body; a plurality of wheel assemblies each having a rotation axis; at least one suspension linkage, each suspension linkage coupling a respective wheel assembly to the vehicle body to permit motion of the rotation axis of each respective wheel assembly relative to the vehicle body; a damper coupled to a respective suspension linkage to constrain the motion of the associated wheel assembly by applying a damper reaction force to the suspension linkage, the damper being configured to be responsive to a damper force control output to vary the damper reaction force being applied to the suspension linkage; at least one vehicle sensor configured to provide vehicle condition data; and a damper control unit configured to generate the damper force control output that causes the damper to generate respective damper reaction forces to act against the suspension linkage to control the motion of the wheel assembly towards a set position for the wheel assembly relative to the vehicle body, the damper force control output being calculated based on the current velocity of the vehicle and the vehicle condition data.

The damper control unit may be configured to calculate the damper force control output based on the vehicle condition data and sets of adjustment factors, the damper control unit may select a set of adjustment factors to calculate the damper force control output based on the current velocity of the vehicle. The damper control unit may select a first set of adjustment factors to calculate the damper force control output when the current vehicle velocity is between first and second vehicle speeds. The damper control unit may select a second set of adjustment factors to calculate the damper force control output when the current vehicle velocity is between second and third vehicle speeds. The value of the second vehicle speed may be different depending on whether the vehicle speed is increasing or decreasing.

The vehicle may be capable of moving at speeds within a speed range and the speed range may be divided into a plurality of speed bands, the damper control unit may be configured to select a respective one of the sets of adjustment factors in dependence on the speed band that the current velocity falls within. The sets of adjustment factors may each cause the vehicle to have different handling characteristics. The damper coupled to a respective suspension linkage may constrain the motion of the associated wheel assembly by applying a damper reaction force towards the set position of the suspension linkage. The dampers may be fluid dampers and the dampers may be configured to produce the damper reaction force by controlling fluid flow within the damper.

The present invention will now be described by way of example with reference to the accompanying drawings. In the drawings:

BRIEF DESCRIPTION OF THE DRAWINGS

FIG. 1 shows a schematic plan view of a vehicle comprising a damper control system.

DETAILED DESCRIPTION OF THE INVENTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle that comprises a vehicle body and a plurality of wheel assemblies each having a rotation axis. The vehicle has at least one suspension linkage, each suspension linkage coupling a respective wheel assembly to the vehicle body to permit motion of the rotation axis each wheel assembly relative to the vehicle body. Each suspension linkage couples a respective wheel assembly to the vehicle body to permit motion of the rotation axis each wheel assembly relative to the vehicle body in a direction generally perpendicular to the rotation axis. The motion may cause the orientation of the rotation axis of the wheel to rotate over the movement range of the suspension linkage. The motion of each rotation axis relative to the vehicle body of each wheel is constrained to move in a generally vertically orientated direction. The vehicle has at least one suspension linkage, each suspension linkage coupling a respective wheel assembly to the vehicle body to permit translational motion of each wheel assembly relative to the vehicle body.

Coupled to a respective suspension linkage the vehicle has a damper to constrain the motion of the associated wheel assembly by applying a damper reaction force to the suspension linkage. The damper being configured to be responsive to a damper force control output to vary the damper reaction force being applied to the suspension linkage. The vehicle also comprises at least one vehicle sensor configured to provide vehicle condition data. The vehicle may also comprise a damper control unit configured to generate the damper force control output that causes the damper to generate respective damper reaction forces to act against the suspension linkage to control the motion of the wheel assembly towards a set position for the wheel assembly relative to the vehicle body, adjust the set position based on a change in the vehicle condition data, and calculate the set position based on variations in the vehicle condition data over time. The vehicle may also comprise a damper control unit configured to generate the damper force control output that causes the damper to generate respective damper reaction forces to act against the suspension linkage to control the motion of the wheel assembly towards a set position for the wheel assembly relative to the vehicle body, the damper force control output being calculated based on the current velocity of the vehicle and the vehicle condition data.

FIG. 1 shows a vehicle 1. The vehicle 1 comprises a plurality of wheels 2 for supporting the vehicle body 3. The vehicle 1 comprises a suspension system for supporting the vehicle body 3 on wheels 2. The suspension system comprises a suspension linkage 4 coupled between a wheel 2 and at least one mounting point 5 on the vehicle body 3. A suspension linkage 4 couples a respective wheel 2 to the vehicle body 3. Therefore, there may be one suspension linkage 4 per wheel 2. Each wheel 2 is typically mounted on bearings 6, and thus suspension linkage 4 may be coupled between a wheel bearing 6 and a vehicle body mounting point 5. The wheel 2 can rotate about a rotation axis to permit movement on a motion surface such as a road. This rotation axis may be defined by wheel bearing 6. The wheel 2 together with ancillary items such as bearings 6 and, for example, a wheel brake together may form a wheel assembly. Thus each wheel assembly may have a rotation axis associated with it about which the wheel assembly turns to permit movement on the motion surface.

Suspension linkage 4 may be constituted by a single link. It will be appreciated that suspension linkage 4 may be constituted by a more complicated arrangement of linkages to couple each wheel 2 to the vehicle body 3 as required by the particular motion requirements of wheels 2. For instance, suspension linkage 4 may be a wishbone linkage as illustrated in FIG. 1 or alternatively suspension linkage 4 may be a double wishbone linkage.

Each suspension linkage 4 permits motion of the suspension linkage's 4 respective wheel 2 relative to vehicle body 3. Each suspension linkage 4 has a movement range which is the total motion range of the wheel 2 relative to the vehicle body 3. Generally, suspension linkage 4 permits the wheel 2 to move in with a generally vertical movement. Other motions of the wheel 2 may also be permitted by suspension linkage 4, for instance the camber of wheel 2 may be permitted to alter and/or the position of the hub/bearing 6 of the wheel may be permitted to move in a lateral direction over the movement range of the suspension linkage 4.

To control the motion of the wheel 2, relative to the vehicle body 3, over the suspension linkage's 4 motion range, the vehicle 1 comprises at least one damper 7 associated with the suspension linkage 4. The damper 7 is coupled to the suspension linkage 4 to constrain the motion of the suspension linkage 4 over the motion range. The at least one damper 7 may be coupled between suspension linkage 4 and vehicle body 3 as shown in FIG. 1 to constrain the motion of suspension linkage 4. Alternatively, or as well as, at least one damper 7 may be coupled between elements of the suspension linkage 4 to constrain the motion of suspension linkage. The at least one damper 7 is configured to produce a reaction force against the suspension linkage 4. The reaction force causing control of the motion of the suspension linkage 4 and thus of the wheel 2 coupled to the respective suspension linkage 4.

Vehicle 1 may also comprise one or more springs 8, or other resilient biasing means, coupled to the suspension linkage 4. Springs 8 may be physical springs such as a wound metal spring or may be formed from part of the motion resistance provided by dampers 7. As with dampers 7, the springs 8 may be coupled between suspension linkage 4 and vehicle body 3 and/or may be coupled between elements of the suspension linkage 4. Springs 8 provide support to the suspension linkages 4 and thus to vehicle body 3. Springs 8 bias the suspension linkages 4 so that at rest the suspension linkages 4 tend to a normal position. This normal position is the point in the motion range of the suspension linkage 4 that the suspension linkage 4 tends towards when there are no external motion forces acting on the vehicle 1. No external motion forces may be acting on the vehicle 1 when the vehicle is at rest or when the vehicle 1 is moving with constant velocity that generates substantially no force on the vehicle 1 due to air resistance. The normal position may be a range of positions centred around the normal position. This may be due to internal resistances in the suspension system and/or the direction from which the suspension linkage 4 approaches the normal position.

Dampers 7 may be fluid dampers, i.e. the reaction forces generated by dampers 7 may be derived from the damper controlling the flow of a fluid. The fluid may be air or liquid. The liquid may be a hydraulic liquid such as oil or water. Dampers 7 may generate reaction forces by some other means, for instance they may comprise electromagnetics which generate the reaction forces by magnetic interaction between elements comprised by the damper 7. The dampers 7 may be any combination of types of dampers 7.

Dampers 7 may have a way in which the reaction force generated by the damper at a particular point in the dampers damping range can be varied. As discussed above, this may be by varying the magnetic interaction between elements comprised by the damper 7. Alternatively, the damper 7 may comprise at least one piston 9 located in a damper cylinder (shown by 11 and 12 together). The piston 9 divides the respective damper chamber into two damper chambers 11, 12. Piston 9 can move through damper cylinder altering the volume of the two damper chambers 11, 12 as it does so. As one damper chamber 11, 12 increases in volume the other damper chamber 11, 12 decreases in volume. The piston 9 acts on fluid contained in the damper chambers 11, 12. Thus the reaction force generated by damper 7 corresponds to the force generated by piston 9 acting on the fluid contained in the damper chambers 11, 12.

Fluid can flow in and out of first and second damper chambers 11, 12 via first and second controllable valves 13, 14. Controllable valves 13, 14 are configured to vary the size of an opening through which fluid can pass. In other words, the size of the restriction in the fluid path between each damper chambers 11, 12 and the exterior of the respective chamber is variable, this variation being provided by each of the controllable valves 13, 14. The controllable resistance to fluid flow provided by controllable valves 13, 14 can alter the force on piston 9 as it moves through the damper cylinder and thus alter the reaction force provided by damper 7. Each controllable valve 13, 14 may be responsive to a valve control input to control the opening of the valve and thus the size of the restriction.

The damper chambers 11, 12 may be connected to each other, and/or other dampers of vehicle 1 by a fluid interconnection system 15. The fluid interconnection system 15 may comprise one or more fluid springs 16. Fluid spring 16 may be a fluid accumulator. The fluid interconnection system 15 can provide a more static element to the reaction force generated by the dampers 7 by restricting the flow of fluid between the damper chambers 11, 12.

The damper 7 may comprise more than one damper cylinder. Each damper cylinder may have controllable valves, or alternatively the variation in the damper reaction force may be provided by controllable valves being present on only one damper cylinder of the damper.

The damper 7 may be semi-active in its operation: the damper 7 may be capable of generating a reaction force only in a direction against the current motion direction of the suspension linkage. In other words, the damper may be capable of generating a reaction force only opposite to the damper velocity. The damper velocity being the velocity at which the damper's components are moving due to the motion of the suspension linkage. In this way, the damper can provide resistance to the suspension linkage's motion but not actively induce motion in the suspension linkage.

The damper 7 may be active in its operation: the damper 7 may be capable of generating a reaction force in a direction both against the current motion direction of the suspension linkage and with the current motion direction of the suspension linkage. Where the damper 7 is active, the active damper 7 can act as both an impedance to the suspension linkage motion and also as an actuator to the suspension linkage motion. In other words, the damper may be capable of generating a reaction force in both directions: opposite to the damper velocity and in the same direction as the damper velocity. The damper 7 may also generate a force in those two directions when the suspension linkage is stationary and so the damper velocity is zero. In the case of a fluid dampers, the fluid entering the damper through valves may be under pressure which permits the damper to exert a force irrespective of the direction of the damper velocity or if it is zero. In the case of an electromagnetic damper, the damper 7 may generate an electromagnetic field that permits the damper to exert a force irrespective of the direction of the damper velocity or if it is zero. In this way, the damper force may be positive or negative relative to the motion direction of the suspension linkage.

The vehicle 1 may comprise a damper reaction force measuring device for each suspension linkage 4. This damper force measuring device may be configured to measure the instant damping force being provided by the dampers coupled to that suspension linkage 4.

In the case of a fluid damper system, the vehicle 1 may comprise damper pressure sensors 17, 18 configured to sense pressure in a respective damper cylinder. The vehicle may comprise damper pressure sensors 17, 18 for each suspension linkage 5. One damper pressure sensor 18 may sense the pressure of fluid in the first damper chamber 11 and one damper pressure sensor 17 may sense the pressure of fluid in the second damper chamber 12. Two pressure sensors, one to each side of piston 9 enables the sensing of the pressure during both travel directions of the piston 9. As the pressure of the fluid that the piston 9 acts against provides a force against that piston, the pressure sensors can be used to calculate the reaction force being generated by the damper at that time. The use of two pressure sensors provides for an accurate calculation of the damper reaction force in each motion direction of the damper. However, it will be appreciated that as the piston separates fluid in each damper chamber that one pressure sensor could be used in one damper chamber and the pressure to each side of the piston be derived from this one pressure sensor. Where a damper 7 comprises multiple damper cylinders (shown at 11 and 12), it may be sufficient for only one damper cylinder to have pressure sensor(s) attached to it to be able to calculate the damper reaction force.

The operation of the dampers 7 to provide variable reaction forces is regulated by a damper control unit 19. The damper control unit 19 may form part of, or may be comprised within, a vehicle management unit. The vehicle management unit may comprise other control systems such as an engine control unit. The damper control unit 19 comprises a processor 20 and a non-volatile memory 21. The memory 21 stores a set of program instructions that are executable by the processor, and reference data such as look-up tables that can be referenced by the processor in response to those instructions. The processor 20 may be configured to operate in accordance with a computer program stored in non-transitory form on a machine readable storage medium. The computer program may store instructions for causing the processor to perform the operations of the damper control unit in the manner described herein.

The damper control unit 19 is coupled to damper(s) 7, that are coupled to each suspension linkage 4, to receive from them data that can be used to generate the current generated damper reaction force. The damper control unit 19 may be coupled to each of the pressure sensors 17, 18 to receive readings of the current pressure in damper chambers 11, 12. The damper control unit 19 may be configured to derive the current damper reaction force of each suspension linkage 4 based on the received current pressure readings. The damper control unit 19 may utilise one or more look-up tables to derive the damper reaction forces from the pressure readings.

Where pressure sensors 17, 18 are being used to derive the current damper reaction force for each suspension linkage 4, the damper control unit 19 may remove from the pressures output by the pressure sensors the element of the sensed pressure that is due to the fluid interconnection system 15. The fluid interconnection system 15 may comprise fluid springs or accumulators 16 as well as other components that control and influence the pressure within the fluid interconnection system. These components cause a resistance to the flow of fluid and thus contribute to the pressure generated within the damper chambers 11, 12. Therefore, for the damper control unit 19 to accurately derive the current damper reaction force being generated by a respective damper 7, the pressure due to the fluid interconnection system 15 may be removed by the damper control unit 19 prior to calculating the current damper reaction force. The pressure due to the fluid interconnection system 15 may be calculated based on the current damper displacement, i.e. the position of the piston within the damper cylinder (shown at 11 and 12) using a model of the fluid interconnection system 15. The damper control unit 19 may utilise one or more look-up tables to derive the pressure due to the fluid interconnection system 15 at a particular damper displacement.

The vehicle may also comprise a rotation sensor 22 associated with each suspension linkage 4. The rotation sensor 22 detects the current rotational position of the suspension linkage 4 within the movement range of the suspension linkage 4. The damper control unit 19 is coupled to the rotation sensors 22 to receive from them a current rotational position input which indicates the current rotational position of the respective suspension linkage 4. The rotational position of the suspension linkage 4 can be used by the damper control unit 19 to derive the position of wheel 2, associated with that respective suspension linkage 4, within the limits of possible travel of wheel 2. The damper control unit 19 may utilise one or more look-up tables to derive the damper reaction forces from the rotational position inputs from the rotation sensors 22.

The vehicle may also comprise an acceleration sensor 23 associated with each wheel 2. The acceleration sensor 23 may be coupled to wheel hub or wheel bearing 6 so that the acceleration sensor 23 can sense the vertical acceleration of the wheel 2 relative to the vehicle body 3. The acceleration sensor 23 may be a one-axis accelerometer configured to sense accelerations in the vertical direction. The damper control unit 19 is coupled to the acceleration sensors 23 to receive from them a wheel acceleration input which indicates the current acceleration of the respective wheel 2.

The vehicle 1 may also comprise acceleration sensor(s) which measure at least one of heave, pitch and roll of the vehicle body. As illustrated in FIG. 1, the vehicle 1 may comprise:

a heave acceleration sensor 24 which measures the vertical acceleration of the vehicle body 3;

a roll acceleration sensor 25 which measures the acceleration of the vehicle body about a longitudinal centreline of the vehicle 3;

a pitch acceleration sensor 26 which measures the acceleration of the vehicle body about a lateral centreline of the vehicle 3.

The damper control unit 19 is coupled to the one or each of the heave acceleration sensor 24, the roll acceleration sensor 25, the pitch acceleration sensor 26 to derive, respectively, the current vertical displacement of the vehicle body relative to the wheels 2, the current rotational position of the vehicle body about the longitudinal centreline of the vehicle body relative to the wheels 2, the current rotation position of the vehicle body about the lateral centreline of the vehicle body relative to the wheels 2.

The damper control unit 19 can use the various inputs describing the current vehicle conditions to derive the current damper reaction forces that the dampers 7 should be controlled to provide to the respective suspension linkages. These damper reaction forces are selected to provide the required control to the motion of the wheels 2 with respect to the vehicle body to optimise the ride quality, tyre grip and/or handling of the vehicle. The damper control unit 19 is coupled to the dampers 7 to provide the damper force control output to the dampers 7 associated with each of the suspension linkages 4. The damper force control output informs the damper 7 of the current damper reaction force that the damper(s) 7 associated with that suspension linkage should produce at that given point in time. In the case of the fluid dampers 7 described above, the damper control unit 19 is coupled to the controllable valves 13, 14. The damper control unit 19 may provide the controllable valves 13, 14 with an input that controls the opening of each of the valves 13, 14. The damper reaction force output in this case may be in the form of valve opening output. The valve opening output may supply a current level to the valve which is associated with a particular size of valve opening. The damper control unit 19 may derive that required opening from the desired damper reaction force. The damper control unit 19 may use one or more look-up tables to convert the desired damper reaction force in to the required opening for each of the controllable valves 13,14.

As discussed above, the dampers 7 are configured to provide reaction forces to constrain the motion of the suspension linkage towards a normal position. This normal position can vary during use of the vehicle. Instability or undesirable control action can occur when the damper control unit 19 is attempting to control the suspension linkage by variation of the damper reaction force towards a set position that is different to the current normal position of the suspension linkage. Undesirable control action may be force demands that are undesirable but do not lead to instability in the system. For instance, a jacking motion of the vehicle as it moves along. Such a deviation can occur when the sensed conditions affecting the normal position of the suspension linkage change. A change in conditions affecting the vehicle 1 may occur generally in two broad types: (i) changes to the vehicle parameters; and (ii) changes to conditional parameters not associated directly with changes to physical properties of the vehicle. The damper control unit 19 can sense changes associated with the static vehicle parameters and/or changes to the conditional parameters using any number of vehicle sensors such as those described above with reference to FIG. 1. Those vehicle sensors may each be configured to generate vehicle condition data.

Changes to vehicle parameters may include:
change in fuel level which changes the vehicle mass;
change in vehicle mass, for instance: due to an increase or decrease in the number of passengers the vehicle is carrying, due to an increase or decrease in the cargo the vehicle is carrying;
change in aero-loading on the vehicle, for instance: due to a change in speed of the vehicle, alteration of aerodynamic elements of the vehicle such as spoilers.

Changes to conditional parameters may include:
sensor drift: the vehicle condition data output by the vehicle sensor may alter over time for a given value of a measured vehicle condition;
calibration errors: the vehicle condition data output by the vehicle sensor may be offset from the actual value of a measured vehicle condition;
the vehicle condition data output by the vehicle sensor may vary in a manner different to that of the variation of the measured value of a measured vehicle condition. For instance, the vehicle condition data output by the vehicle sensor may vary non-linearly as there is a linear variation in the measured value.

The damper control unit 19 may be configured to adjust the set position in response to a change in the vehicle condition data. A change in vehicle condition data can indicate that there has been an alteration to the vehicle parameters as given above. The set point may alter because the vehicle is now, for example, more heavily loaded than it was before and so the vehicle may sit lower on the suspension system than it did previously, i.e. the normal position of the wheels 2 relative to the vehicle body 3 may be higher than before. Thus the damper reaction forces that are calculated need to take in to account this change.

Another example is the change in the aero-loading on the vehicle. For instance, as the speed of the vehicle 1 changes, the downforce on the vehicle 1 may alter. This alteration in the downforce may, in effect, cause a variation in the weight of the vehicle body and thus change the normal position of the wheels 2 relative to the vehicle body 3. Therefore, the damper control unit needs to take in to account this change in the set position of the suspension elements 4.

The damper control unit 19 may calculate how the change in vehicle condition data effects the normal position of the suspension elements 4 and adjust the set position in response to that calculation. This adjustment can occur in response to the change in vehicle condition data. Such an adjustment can occur on a feed-forward basis in that the adjustment occurs soon after the change in vehicle condition data has been sensed.

The damper control unit 19 may also be configured to calculate the set position based on variations in the vehicle condition data over time. Variations in the vehicle condition data over time may be indicative of changes to conditional parameters not associated directly with changes to physical properties of the vehicle 1. The damper control unit 19 may be configured to calculate an average of at least one sensed vehicle parameter over time and based on that average adjust the set positions of the suspension elements 4.

The damper control unit 19 may be configured to calculate the set position by detecting a steady state motion condition for the vehicle 1 based on the vehicle condition data. Such a steady state motion condition may be when the vehicle is moving but with a motion which means the average position of the suspension element is at the normal position. Such a motion may occur when the vehicle 1 is moving with, for example, low speed, in a straight line, and/or with minimal steering input. The damper control unit 19 can therefore calculate the set position based on variations in the vehicle condition data over time. Such a calculation can help avoid the changes to the conditional parameters detailed above because the damper control unit 19 assesses the data over a period of time during which it is likely that any changes to the conditional parameters due to errors will be averaged out.

As discussed herein, the dampers 7 are configured to provide reaction forces to constrain the motion of the suspension linkage 4 towards a normal position. The size of the reaction forces generated by the dampers 7 effects the rate at which the suspension linkages are controlled towards the normal position, or set position. The reaction forces generated by the dampers 7 are generally proportional to the distance of the wheel 2 from the set position or, at least, calculated based on the distance of the wheel 2 from the set position. The reaction forces generated by the dampers 7 may also be calculated based on the velocity of the motion of wheel 2 relative to the set position. Using the distance of the wheel 2 from the set position and/or the velocity of the motion of the wheel 2 relative to the set position allows for variations in the reaction forces dependent on current motion state of the vehicle. For instance, this permits different damping to be applied depending on whether a wheel is experiencing movement due to bump or roll. In addition, if the wheel 2 is moving towards the set point and with a velocity that, knowing the current amount of damping in the system, will take the wheel past the set point then a damping force may be applied to attempt to slow the motion of the wheel 2 past the set point.

The direction that the reaction forces is applied is opposite to the motion direction of the wheel 2 and thus the wheel assembly. Thus, when the wheel 2 is moving towards the set point the reaction force is applied away from the set point and when the wheel 2 is moving away from the set point the reaction force is applied towards the set point. The reaction forces are applied is so as to be dependent on whether the wheel 2 is moving towards or away from the set point.

More generally, the reaction forces may be calculated based on the vehicle condition data, for example as discussed herein.

The rate at which the suspension linkages are controlled towards the set point effects the balance between ride quality, tyre grip and handling of the vehicle. There may be situations where the balance between those factors is chosen to be weighted in a particular way, for example if the vehicle is to be driven enthusiastically on a track, or driven in a comfortable manner.

The rate at which the suspension linkages are controlled towards the set position may be set based on the current velocity of the vehicle 1. This is because the desired balance between the above factors generally alters as the speed of the vehicle 1 changes. Therefore, the way in which the damper control unit 19 may be configured to calculate the damper reaction forces at low speeds may be different to the way in which the damper control unit 19 may be configured to calculate those damper reaction forces at higher speeds. This can be because at lower speeds ride quality, i.e. the way in which the vehicle 1 suspension system handles bumps and turns, can be more important, but at higher speeds tyre grip and handling can become more important. Therefore, the damper control unit 19 can be configured to calculate the damper reaction forces based on the current velocity of the vehicle. As there are bands of vehicle speeds within which common vehicle handling characteristics are desirable, the damper control unit 19 may be configured to use a first set of adjustment factors to calculate the damper reaction forces based on the vehicle condition data when the current vehicle speed is between first and second vehicle speeds and configured to use a second set of adjustment factors to calculate the damper reaction forces based on the vehicle condition data when the current vehicle speed is between second and third vehicle speeds. The damper control unit 19 may be configured to apply hysteresis to the transition between the use of different sets of adjustment factors. The intermediate vehicle speed, in the above case second vehicle speed, where the transition occurs between the damper control unit 19 using the first set of adjustment factors and the second set of adjustment factors, may be different depending on whether the vehicle speed is increasing or decreasing.

Any number of blocks of vehicle speeds may be used to obtain the required vehicle handling characteristics. For example:
- a first set of adjustment factors may be used when the current vehicle speed is between zero and a first vehicle speed;
- a second set of adjustment factors may be used when the current vehicle speed is between a first vehicle speed and a second vehicle speed;
- a third set of adjustment factors may be used when the current vehicle speed is between a second vehicle speed and a third vehicle speed; and
- a fourth set of adjustment factors may be used when the current vehicle speed is between a fourth vehicle speed and maximum vehicle speed.

The blocks of vehicle speeds may be a plurality of speed bands. This plurality of speed bands each being a portion of the range of speeds at which the vehicle can travel. I.e. the vehicle may be capable of moving at all the speeds within a speed range and the speed range is divided into a plurality of speed bands. This speed range may be from zero to a maximum forward speed. There may also be a speed range from zero to a maximum reverse speed. There may be a set of adjustment factors associated with each of the speed bands. The set of adjustment factors associated with the current speed band of the vehicle may be used during the period that the vehicle has a current vehicle speed within that speed band.

As discussed above, the second, and third vehicle speeds may have different values depending on whether the vehicle speed is decreasing or increasing.

Each set of adjustment factors may have a specific balance between ride quality, tyre grip and handling of the vehicle. This balance being obtained by variation in the way in which the dampers 7 control the motion of the suspension linkages 4 by generating reaction forces towards the set position.

The current velocity of the vehicle 1 may be sensed by a vehicle sensor or calculated by the vehicle management system based on the inputs such as the engine speed, wheel size, and gear ratio of the vehicle 1. The damper control unit 19 may be configured to receive a vehicle speed input indicating the current speed of the vehicle.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   a vehicle body;
   a plurality of wheel assemblies each having a rotation axis;
   at least one suspension linkage, each suspension linkage coupling a respective wheel assembly to the vehicle body to permit motion of the rotation axis of each respective wheel assembly relative to the vehicle body;
   a damper coupled to a respective suspension linkage to constrain the motion of the associated wheel assembly by applying a damper reaction force to the suspension linkage, the damper being configured to be responsive to a damper force control output to vary the damper reaction force being applied to the suspension linkage;
   at least one vehicle sensor configured to provide vehicle condition data; and
   a damper control unit configured to generate the damper force control output that causes the damper to generate respective damper reaction forces to act against the suspension linkage to control the motion of the wheel assembly towards a set position for the wheel assembly relative to the vehicle body, adjust the set position based on a change in the vehicle condition data, and calculate the set position based on variations in the vehicle condition data over time.

2. A vehicle according to claim 1, wherein the change in vehicle condition data indicates that the mass of the vehicle has changed.

3. A vehicle according to claim 1, wherein the change in vehicle condition data indicates a change in the aero-loading on the vehicle.

4. A vehicle according to claim 1, wherein the change in vehicle condition data indicates a change in vehicle speed.

5. A vehicle according to claim 1, the damper control unit being configured to calculate an adjustment to a normal position of the at least one suspension elements based on the change in vehicle condition data and adjust the set position based on that calculated adjustment.

6. A vehicle according to claim 1, the damper control unit being configured to calculate the set position based on variations in the vehicle condition data over time by detecting a steady-state motion condition for the vehicle based on the vehicle condition data; and obtaining an average of the position of the wheel assembly relative to the vehicle body from the vehicle condition data over a period of steady-state motion of the vehicle.

7. A vehicle according to claim 1, the damper control unit being configured to calculate the damper force control output based on the vehicle condition data.

8. A vehicle according to claim 1, the damper control unit being configured to calculate the damper force control output based on an average of at least one sensed vehicle parameter comprised in the vehicle condition data over time and calculate the set positions of the suspension linkages based on that average.

9. A vehicle according to claim 1, wherein the damper coupled to a respective suspension linkage constrains the motion of the associated wheel assembly by applying a damper reaction force in a direction opposite to the motion of the associated wheel assembly.

10. A vehicle according to claim 1, wherein the dampers are fluid dampers and the dampers are configured to produce the damper reaction force by controlling fluid flow between at least one damper chamber and the exterior of the damper.

11. A vehicle according to claim 10, wherein the at least one vehicle sensor comprises pressure sensors for each damper configured to sense the pressure of fluid within the at least one chamber of the dampers; the damper control unit being configured to generate the damper force control output based on the current damper reaction force of the dampers, and being configured to calculate the current damper reaction forces based on the pressure of fluid within the at least one chamber of the dampers.

12. A vehicle according to claim 11, wherein the dampers are connected together by a fluid interconnection system; the damper control unit being configured to calculate the current damper reaction forces based on the pressure of fluid within the at least one chamber of the dampers by removing the fluid pressure due to the fluid interconnection system.

13. A vehicle comprising:
a vehicle body;
a plurality of wheel assemblies each having a rotation axis;
at least one suspension linkage, each suspension linkage coupling a respective wheel assembly to the vehicle body to permit motion of the rotation axis of each respective wheel assembly relative to the vehicle body;
a damper coupled to a respective suspension linkage to constrain the motion of the associated wheel assembly by applying a damper reaction force to the suspension linkage, the damper being configured to be responsive to a damper force control output to vary the damper reaction force being applied to the suspension linkage;
at least one vehicle sensor configured to provide vehicle condition data; and
a damper control unit configured to generate the damper force control output that causes the damper to generate respective damper reaction forces to act against the suspension linkage to control the motion of the wheel assembly towards a set position for the wheel assembly relative to the vehicle body, the damper force control output being calculated based on the current velocity of the vehicle and the vehicle condition data.

14. A vehicle according to claim 13, the damper control unit being configured to calculate the damper force control output based on the vehicle condition data and sets of adjustment factors, the damper control unit selecting a set of adjustment factors to calculate the damper force control output based on the current velocity of the vehicle.

15. A vehicle according to claim 14, wherein the damper control unit selects a first set of adjustment factors to calculate the damper force control output when the current vehicle velocity is between first and second vehicle speeds.

16. A vehicle according to claim 15, wherein the damper control unit selects a second set of adjustment factors to calculate the damper force control output when the current vehicle velocity is between second and third vehicle speeds.

17. A vehicle according to claim 16, wherein the value of the second vehicle speed is different depending on whether the vehicle speed is increasing or decreasing.

18. A vehicle according to claim 14, wherein the vehicle is capable of moving at speeds within a speed range and the speed range is divided into a plurality of speed bands, the damper control unit being configured to select a respective one of the sets of adjustment factors in dependence on the speed band that the current velocity falls within.

19. A vehicle according to claim 14, wherein the sets of adjustment factors each cause the vehicle to have different handling characteristics.

20. A vehicle according to claim 1, wherein the damper coupled to the respective suspension linkage constrains the motion of the associated wheel assembly by applying a damper reaction force towards the set position of the suspension linkage.

21. A vehicle according to claim 1, wherein the dampers are fluid dampers and the dampers are configured to produce the damper reaction force by controlling fluid flow within the damper.

\* \* \* \* \*